United States Patent [19]

Charbonnel et al.

[11] Patent Number: 5,702,217
[45] Date of Patent: Dec. 30, 1997

[54] BRAKING NUTS OR SCREWS AND MOUNTINGS OBTAINED WITH SAME DEVICES

[75] Inventors: Jean-Louis Charbonnel, Boissise le Roi; Michel Franchet, Cesson; Jacky Serge Naudet, Bondoufle, all of France

[73] Assignee: Societe Nationale d'Etude et de Construction de Moteurs d'Aviation "Snecma", Paris, France

[21] Appl. No.: 490,611

[22] Filed: Jun. 15, 1995

[30] Foreign Application Priority Data

Jun. 22, 1994 [FR] France ................... 94 07625

[51] Int. Cl.⁶ .......................... F16B 39/12; F16B 39/36
[52] U.S. Cl. .......................... 411/909; 411/259; 411/277; 411/278
[58] Field of Search .................... 411/277, 278, 411/279, 280, 289, 290, 291, 909

[56] References Cited

U.S. PATENT DOCUMENTS

| | | | |
|---|---|---|---|
| 450,377 | 4/1891 | Richardson | 411/277 |
| 908,542 | 1/1909 | Broluska | 411/277 |
| 2,290,175 | 7/1942 | Gade | 411/277 |
| 2,299,085 | 10/1942 | Gade | 411/277 |
| 2,424,604 | 7/1947 | Dzus | 411/278 |
| 3,740,839 | 6/1973 | Otte et al. | 411/909 |
| 4,880,343 | 11/1989 | Matsumoto | 411/222 |
| 4,893,977 | 1/1990 | Tramezzani | 411/278 |
| 5,127,782 | 7/1992 | McCorkle et al. | 411/280 |
| 5,143,499 | 9/1992 | Bobo et al. | 411/247 |
| 5,160,227 | 11/1992 | Tramezzani | 411/278 |
| 5,366,331 | 11/1994 | Erbes | 411/433 |

FOREIGN PATENT DOCUMENTS

| | | | |
|---|---|---|---|
| 764544 | 3/1934 | France | 411/278 |
| 2 045 262 | 2/1971 | France . | |
| 2 306 784 | 11/1976 | France . | |
| 2407385 | 5/1979 | France | 411/277 |
| 2 554 185 | 5/1985 | France . | |
| 1 569 915 | 6/1980 | United Kingdom . | |
| 2 210 429 | 6/1989 | United Kingdom . | |
| WO 92/15792 | 9/1992 | WIPO . | |

Primary Examiner—Rodney M. Lindsey
Assistant Examiner—Tuyet-Phuong Pham
Attorney, Agent, or Firm—Oblon, Spivak, McClelland, Maier & Neustadt, P.C.

[57] ABSTRACT

Screw or nut braking rings and mountings established with the rings include a nut having an upper portion hollowed from a circular throat. Slits divide the upper portion into blocks by cutting the throat. A shape-memory alloy ring is housed in the throat so as to retighten the blocks on the threaded portion of the mounting and thus tighten it. The ring exhibits a change between the tightening state and a mounting state where it is free in the throat and can be easily mounted.

1 Claim, 5 Drawing Sheets

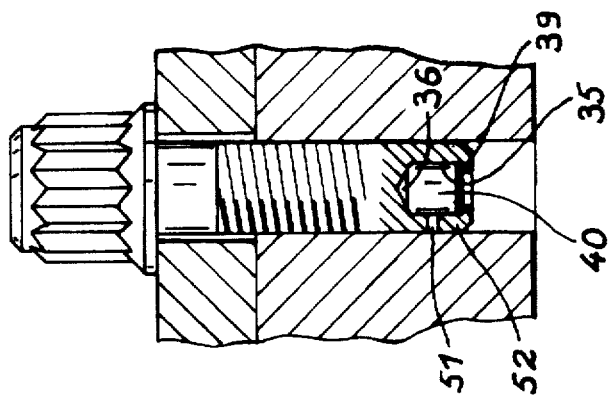
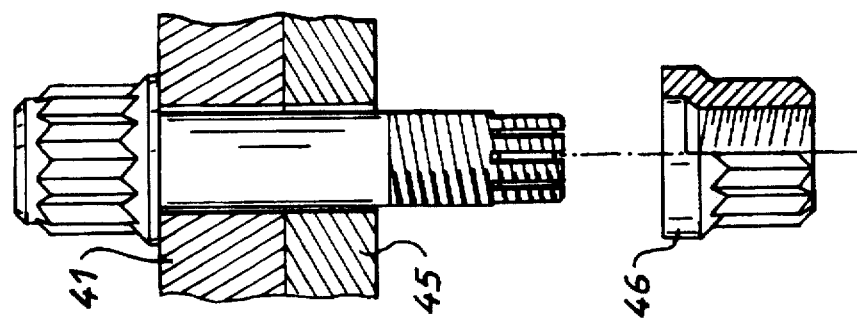
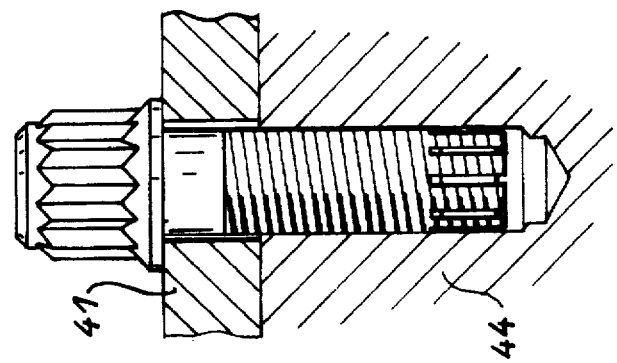
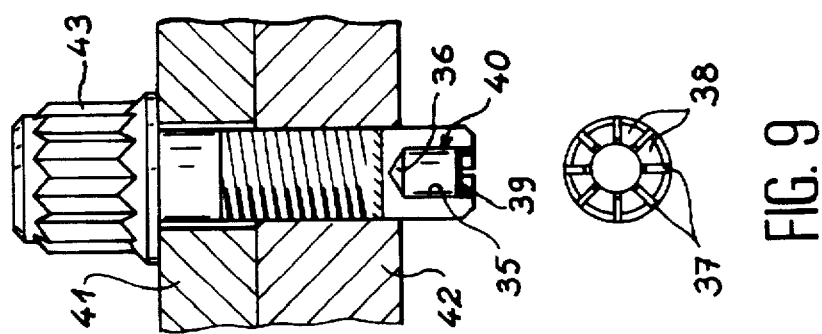

BRAKING NUTS OR SCREWS AND MOUNTINGS OBTAINED WITH SAME DEVICES

FIELD OF THE INVENTION

The invention concerns braking nut or screws and mountings obtained with said nuts or screws.

BACKGROUND OF THE INVENTION

It has frequently been found that there is a need to brake screws and nuts by stopping them at a fixed position on the parts on which they are mounted, especially in situations where accidental loosenings are rendered posssible by significant rises of temperature which produce heat expansions which are sometimes difficult to assess, or by vibrations. Land or in particular air vehicles possess many of these mounting systems.

A current braking system, used for example with a ball beating and a nut which keeps it at a specific position of a shaft, includes a washer tightened with the nut and the ring and whose angular position on the axis is rendered constant by a key or equivalent device. The washer is provided with tongues over its circumference which can be folded down in recesses disposed as a crown around the nut.

This system is effective with regard to satisfying its aim but does have certain drawbacks. In particular, it is not possible to choose the nut tightening force as the tongues require that it be placed in a limited number of angular positions. Moreover, the plastic deformations imposed on the tongues render it brittle and prohibit the use of washers for a large number of mountings and dismantlings: they therefore need to be replaced. Ruptures of the tongues shall no longer be excluded if the environmental conditions are severe and if, for example, the temperatures are high and the centrifugal forces considerable.

There are also screw and nuts comprising ductile portions wherein the other threaded element of the mounting is tightened. The significant friction obtained between the threads prohibits any unscrewing as long as the deformation persists. The French patent numbers 2 045 262 and 2 554 185 give several examples of these. In the first of these patents, deformation is provided by a tool which warps the weakened portions of the nut in the plastic domain. This method is unsatisfactory in that is unable to accurately assess the tightening force, thus resulting in there being a possible risk of damaging the threads or even jamming the mounting. The behaviour of the mounting in difficult conditions and especially at high temperatures is still a problem. As regards the second patent which concerns a screw containing a pin able to separate the balls, it may be possible to apply a specific force without the above-mentioned drawbacks, but it is undeniable that the addition of several elements to embody tightening causes a complication as regards the screw.

SUMMARY OF THE INVENTION

The main advantages of the invention consist in that braking is fully and solidly ensured with a screw or nut having an extremely simple shape; stressing may be located at will in the elastic domain. The invention consists of the application of shape-memory materials or alloys so as to produce nut and screw braking rings or the threaded elements themselves. It is known that shape-memory materials have a characteristic of possessing a transition temperature which separates two states at colder and hotter temperatures where the elements they constitute have two clearly different shapes.

In this instance, one of the conditions is a mounting condition in which the ring is easily placed on the screw or nut, and the other state is a tightening state in which the ring warps the screw or nut so as to obtain the desired braking.

One basic advantage of the various embodiments of the invention is that the mounting of the threaded elements is extremely easy and short since it does not require that any particular precautions be taken or force applied and that no permanent deformation generally needs be provided to retain the elements after they have been mounted. Furthermore, in principle the mountings obtained are fully reversible.

BRIEF DESCRIPTION OF THE DRAWINGS

There now follows a description of these and other characteristics of the invention with reference to the accompanying non-restrictive figures given by way of illustration:

FIGS. 6 to 8 represent a variety of screws conforming to the invention and used in three different mountings, FIG. 9 is an end view of this screw, FIG. 10 represents another embodiment of a screw able to be used in the invention.

DETAILED DESCRIPTION OF THE PREFERRED EMBODIMENTS

Figure 1:
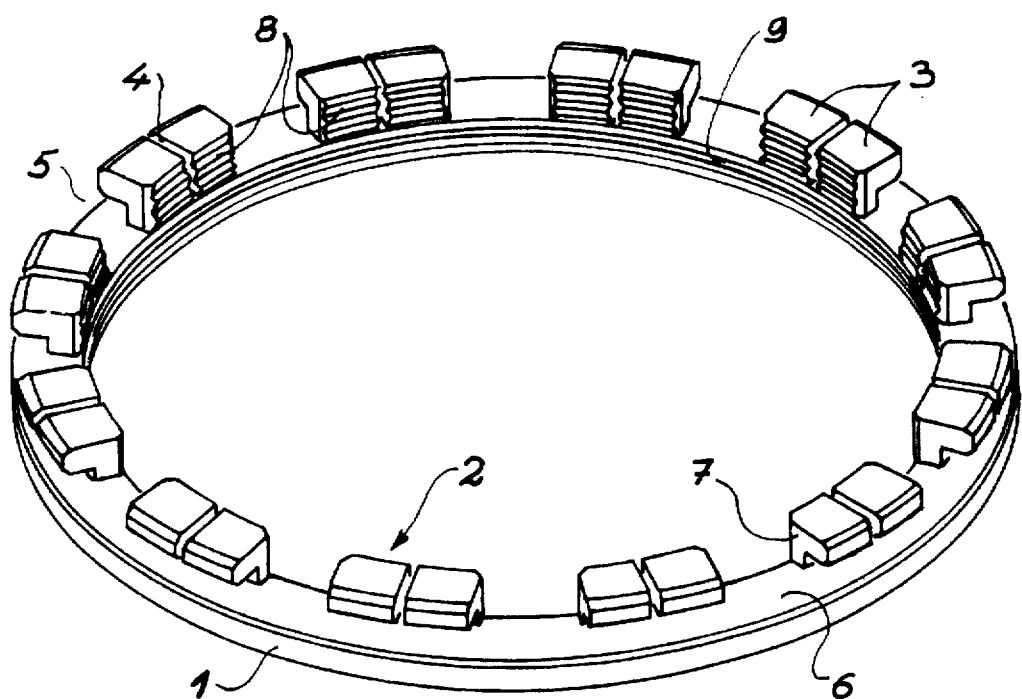
FIG. 1 is an external view of a nut able to be used according to the invention.

FIG. 1 shows a flat nut provided with an ordinary continuous circular base 1 surmounted by a notched portion 2. The notched portion 2 is composed of blocks 3 alternately separated by slits 4 and notches 5 on the circumference of the nut. The notches 5 have the same structure as the slits 4 but are larger. The blocks 3 have a relatively small angular extension of about 10° on the nut. This particular characteristic, added to the existence of a throat 6 on the outer face of the notched portion 2 and which results in the blocks 3 being attached to the base 1 by a thin foot 7, makes it possible to bend the blocks 3 towards the inside of the nut by warping the feet 7. The threads 8 of the blocks 3 used to guide the nut to the level of the threads 9 of the base 1 are then pressed against the threads of the additional threaded element of the mounting and provide the desired tightening.

Figure 2:
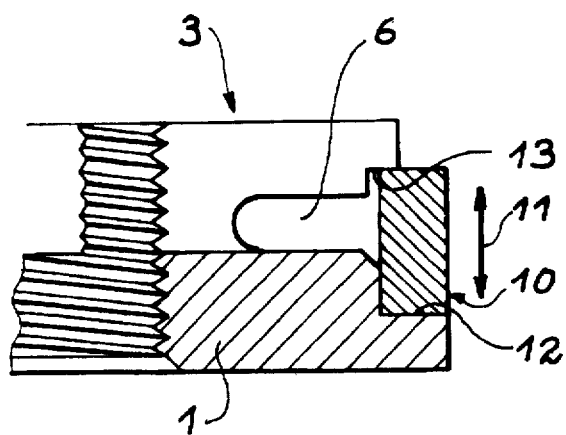
FIGS. 2 and 3 show a diametrical cutaway view of the nut and the ring.

FIG. 2 shows that this action may be carried out by engaging a ring 10 with a rectangular section in the throat 6. As indicated by the arrow 11,, the tightening state produced by the shape-memory material consists of increasing the height of the ring 10 which opens the throat 6. To this effect, the ring 10 is retained between the bearings 12 and 13 situated in front of each other of the base 1 and the blocks 3 and which it separates. The width of the bearing 12 of the base 1 corresponds to the thickness of the ring 10 so as to provide it with good support, whereas the beating 13 of the blocks 3 is much thinner so that it can easily clamp the ring 10 in the throat 6 during a preliminary stage. The nut is rapidly cooled so as to reduce its diameter and make the ring 10 move around the blocks 3 or more simply by warping the blocks 3, which may be effected with a slight amount of force if the outer diameter of the notched portion 2 is properly selected.

Figure 3:
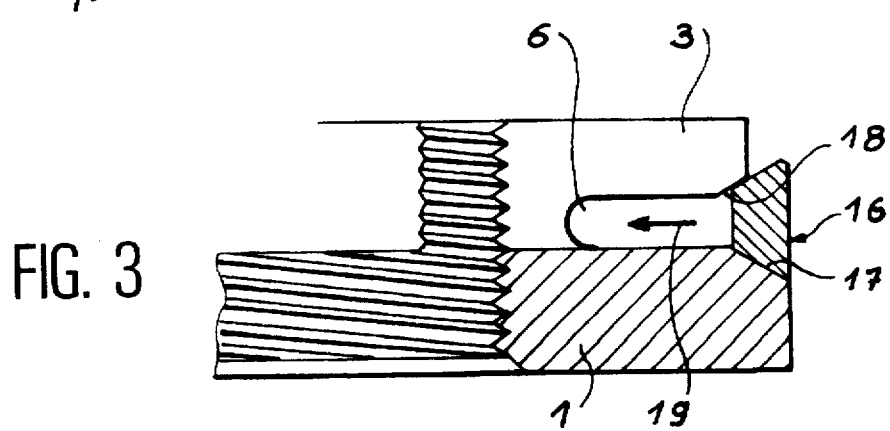

FIG. 3 shows another embodiment where a ring 16 with a trapezoid-shaped section is used whose short and long parallel sides respectively correspond to the internal and outer faces of the ring 16 and the oblique sides rest on the slanted bearings 17 and 18 of the base 1 and the blocks 3. In this embodiment, the change of the shape of the ring 16 corresponds to a diameter contraction along the arrow 19 so that the oblique sides of the ring 16 slide on the bearings 17 and 18 with a corner effect which here again opens the throat 6. Similarly, in the preceding embodiment, the bearing 17 associated with the base 1 is much wider than the blocks 3.

Figure 4A:
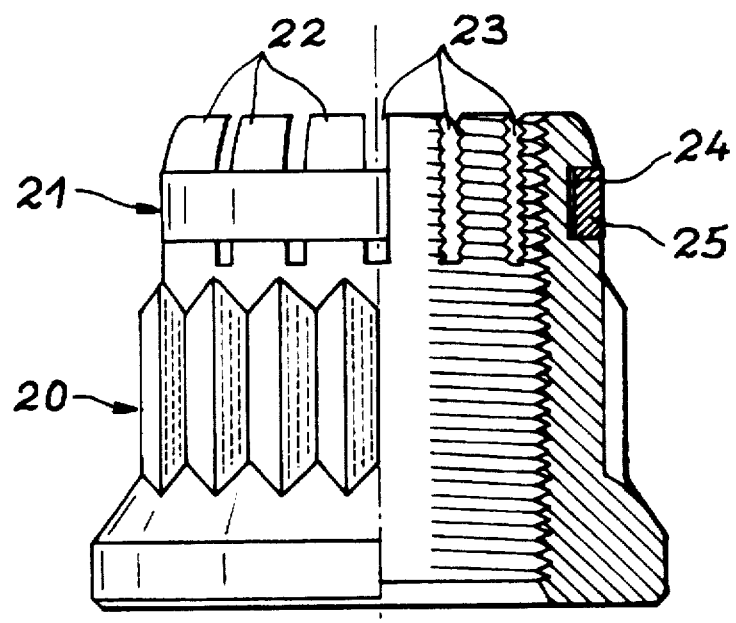
FIGS. 4a, 4b, 5a and 5b represent two other types of nuts and bushes, both threaded.
Figure 4B:
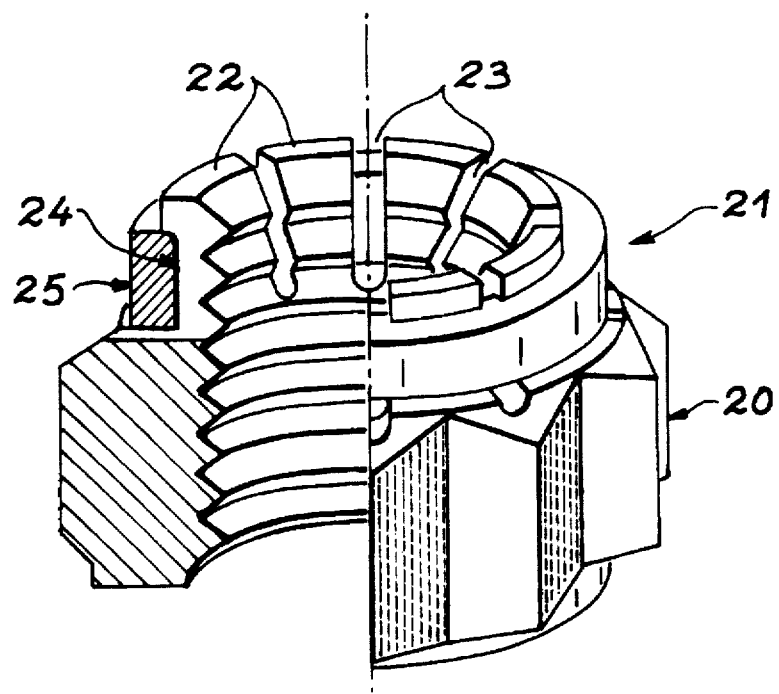

FIGS. 4a and 4b illustrate the application of the invention to a nut provided with drive grooves 20 on most of its outer surface. The deformable zone is located on an extreme portion 21 above the grooves 20. The figures also show blocks 22 similar to the blocks 3, slits 23 similar to the slits of the preceding embodiment, a throat 24 similar to the throat 6 recessed in the blocks 22 and divided by the slits 23, and a ring 25 is mounted in the throat 24. Its section is rectangular but its functioning is similar to that of the ring 16 of FIG. 3 with a diametrical contraction whose effect is to retighten the blocks 22 and close their opening.

Figure 5A:
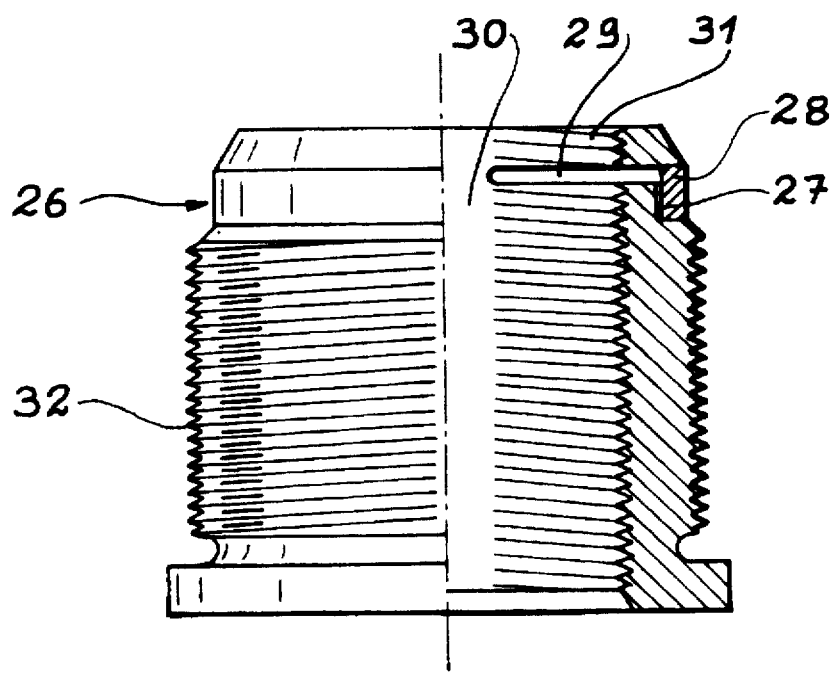

A slightly different embodiment is shown on FIG. 5a. The structure of the extreme portion 26 of the nut shown here is different since, currently with a circular throat 27 recessed on the outer face of the extreme portion 26 and housing a shape-memory ring 28 as in the other embodiments, one or two arcs of circle-shaped slits 29 appear hollowed out in the throat 27. All in all, they extend for the most part by one circumference but not covering the tongues 30 by which a small ring 31 bearing several threads is attached to the rest of the nut. The ring 28 behaves like the ring 10 whose height increases at the transition state which results in opening the slits 29 and warps the small ring 31 whose threads exert the desired tightening.

Figure 5B:
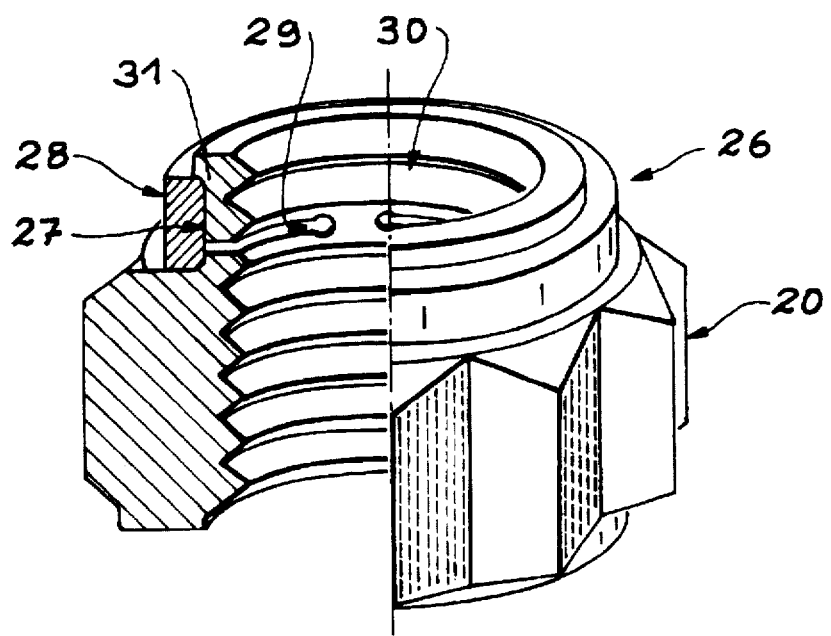

The slits 23 separating the blocks 22 are omitted in this embodiment. The grooves 20 are replaced by an external threading 32. The nut of the preceding embodiment has therefore become a threaded bush. But this latter characteristic does not affect the behavior of the element: the grooves 20 and the outer threading 32 could be inverted in the embodiments of FIGS. 4a and 5a. This is shown on FIG. 5b which accordingly represents a nut similar to that of FIG. 7 but where the outer threading 32 on FIG. 5a is replaced by the grooves 20.

Consideration is now given to other figures illustrating the application of the invention to screws.

FIGS. 6 to 9 show a screw transformed to conform to the invention and including a housing 36 at its threaded end, said housing 36 being notched by diametrical slits 37 and inside the axis of the screws which, as in the preceding embodiments, separate relatively narrow slender blocks 38 as regards their angular width and height. The blocks 38 have a border 39 orientated inwardly which corresponds to a narrowing of the housing 36 at its orifice allowing for crimping of the ring 40. The ring 40 here is engaged and crimped in the housing 36, retained by the edge 39 and may be replaced by a cylindrical slug without departing from the context of the invention. Its change between a mounting condition and a working condition where tightening is carded out consists of a spreading, that is into a diametrical expansion which has the effect of separating the blocks 38. In the mounting of FIG. 6, where the screw rod and in particular the major portion of the block 38 goes beyond the stacking of a pierced plate 41 on which the screw head 43 rests and a tapped plate 42 connected to the preceding one by the screw, the blocks 38 tighten against the threads of the bottom of the tapped plate 42. The situation is the same with the mounting of FIG. 7 where the same screw is completely driven into a dead hole of a tapped plate 44. It shall be observed that the absence of access to the ring 40 still enables it to be mounted correctly or be dismantled as the screw becomes free on this side of the transition state temperature.

The same screw may be used for tightening both of the smooth hole plates 41 and 45 (FIG. 8). In these circumstances, the housing 36 has fully come out of the mounting of plates and an ordinary nut 46 is engaged on the screw and it is this nut which is retained by the blocks 38.

The embodiment of FIGS. 2, 5a, 5b and 7 is also applicable to large diameter screws, as shown on FIG. 10. A ring 40 whose width increases at the transition temperature, is disposed in the throat 35 and the housing 36, but the slits 37 are replaced by arc of a circle-shaped slits 51 which open into the throat delimited in the housing 36 by the edge 39. As in the preceding embodiment, the expansion of the ring 40 separates the small ring 52 delimited by the slits 51 from the rest of the screw.

Figure 11A:
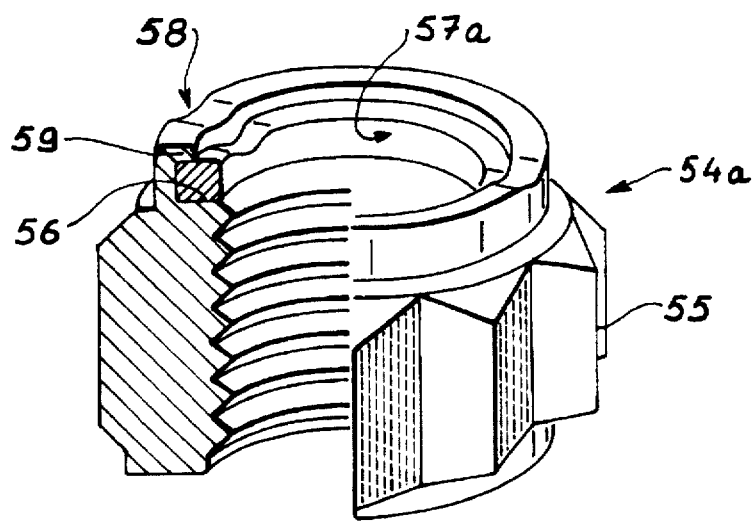
FIGS. 11a and 11b illustrate another type of ring.
Figure 11B:
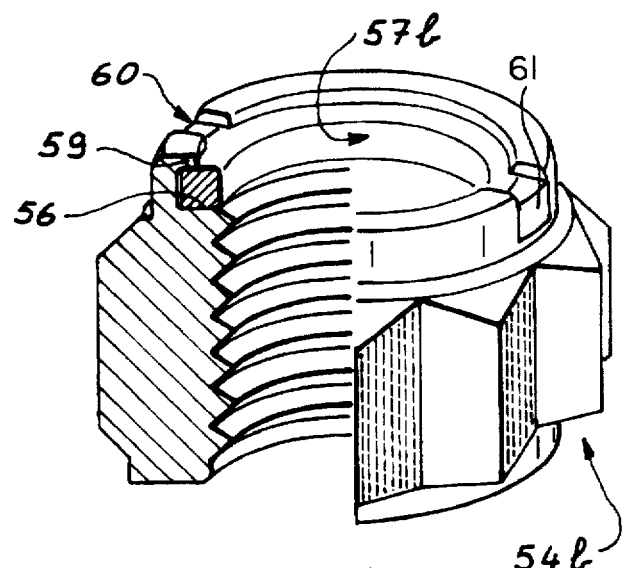

A slightly different embodiment is shown on FIGS. 11a and 11b. A nut 54a or 54b provided with an external molletage 55 for manipulating it is provided with an open-throat housing 56 whose shape makes it possible to introduce into it a shape-memory ring 57a or 57b via the extremity of the nut 54a or 54b to which the housing 56 opens. The ring 57a can be kept in place by hammering the nut 54a at a weakened end location 58 so as to form a flange 59 of the ring 57a. The same result is obtained on the nut 54b provided with notches 60 which indent its extremity and occupy the tongues 61 of the ting 57b and pointing outwardly. The flange 59 may be formed by hammering a weakened portion of the nut 57b at the side of one of the notches 60 or between two of them.

This mounting is useful by virtue of a possibility for ovalizing the rings 57a and 57b which are circular at the mounting temperature. On the change of state temperature, they become oval, contract by one diameter and then squeeze the screw (not shown) on which the nut 54a or 54b is engaged by resting on its threads. This thrusting may be completed by a thrusting on the bottom of the housing 56 resulting from an increasing of another diameter of the ring 57. The link by tightening between the screw and the nut 54 is then total and it may be possible to omit the tongues 61 and the notches 60.

Figure 12:
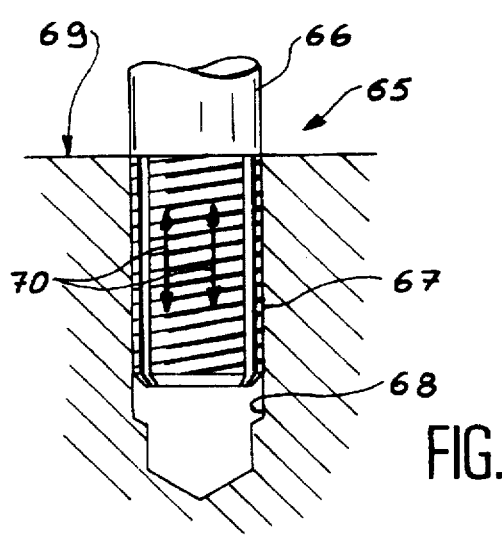
FIG. 12 illustrates a pin.
Figure 13:
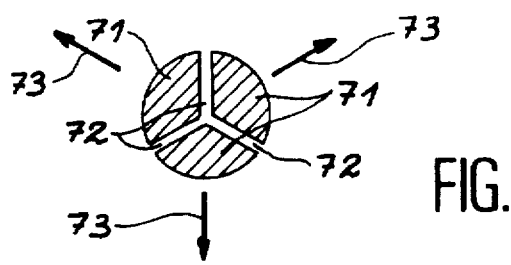
FIG. 13 represents a section of a pin adapted to conform to the invention.

The invention can also be used with pins, as shown on FIGS. 12 and 13, for extremely similar applications and making use of the same technical effect.

In fact, pins instead of screws are used in certain mountings when it is essential to ensure that a threaded rod does not exceed an internal screw thread so as to preserve imperviousness or for any other reason. A pin 65 thus has a smooth rod 66 prolonged by a threaded extremity 67 fully engaged in an internal screw thread 68. The usual method for locking a pin 65 consists of fully screwing it until the end of the smooth rod 66 jams against the inlet of the internal screw thread 68, which causes the threaded extremity 67 to disappear under the surface of the element 69 bearing the pin 65. But then a special tool is required if the pin 65 needs to be extracted and there is always a risk of breaking the pin 65 on shearing it on the surface of the element 69 during this operation.

According to the invention, the conventional pin of FIG. 12 may be replaced by a pin having the same shape but made of a shape-memory alloy. It is possible to screw it using less force into the element 69. On the change of state temperature, the pin 65 or at least its threaded extremity 67 warps so as to be braked in the internal screw thread 68. This warping may be an axial expansion or contraction symbolized by the arrows 70, or a radial expansion resulting from a sectional ovalization (as with the rings 57a and 57b of FIGS. 11a and 11b), or a similar sectional warping, or finally, as shown on FIG. 13, it may be characterized by the opening of circle sector-spaced portions 71 on which the threaded extremity 67 is shaped by radial slits 72. The movement of expansion is then symbolized by the arrows 73.

As regards the other cases, it is clearly pointless to have the threaded extremity 67 divided by the slits 72.

This embodiment may be widened to encompass other threaded elements, such as the nuts and screws which may self-brake on the element to which they are assembled by means of a deformation of their section or via a variation of their width, that is the width of their threads.

In particular, the invention can be used for aircraft engines or other engines subjected to significant temperature variations. The mounting state corresponds to inoperative temperatures, whereas the tightening state corresponds to working temperatures. Mounting and dismantling are therefore relatively simple in inoperative conditions for maintenance or other reasons and braking appears to operate automatically when in reality the conditions and stresses which render it effective are applied. It is advisable to use copper, zinc and aluminium alloys for the engine zones whose working temperature is less than 150° at normal times, copper, aluminium and nickel alloys for engine zones below 200°, and nickel and titanium alloys for zones below 300°. Excess heatings of 50° above these limits are, however, admissible, especially if they last for a short period.

The shape-memory alloys mentioned earlier are most frequently reversible, which means that the elements they form recover their initial state when they return to the mounting temperature. Irreversible shape-memory alloys which only undergo a single change of state after which they remain with the shape corresponding to the working temperature, are also to be considered for certain applications where there is no need to dismantle them.

The change of state temperatures of reversible alloys may also be selected so that the elements are in the same state at inoperative and working temperatures. The change of state is then only aroused on mountings and dismantlings of the elements, that is on sufficiently rare occasions so that the <<memory losses>>, namely losses of capacity of the material on a change of state, do not constitute a serious problem.

What is claimed is:

1. An assembly comprising:

a nut and a ring having a width parallel to the diameter of the ring and a height perpendicular to the diameter of the ring, the nut comprising a circular throat positioned near an axial end of the nut, the nut further comprising at least one arc which defines a circle-shaped notch in the throat, the ring being inserted in the throat and being made of a shape-memory material, wherein the ring undergoes only an increase of height so as to widen the notch on a temperature change from a mounting state to a working state.

* * * * *